(No Model.)
G. J. GRANDPRE.
TIRE TIGHTENER.
No. 556,142.          Patented Mar. 10, 1896.
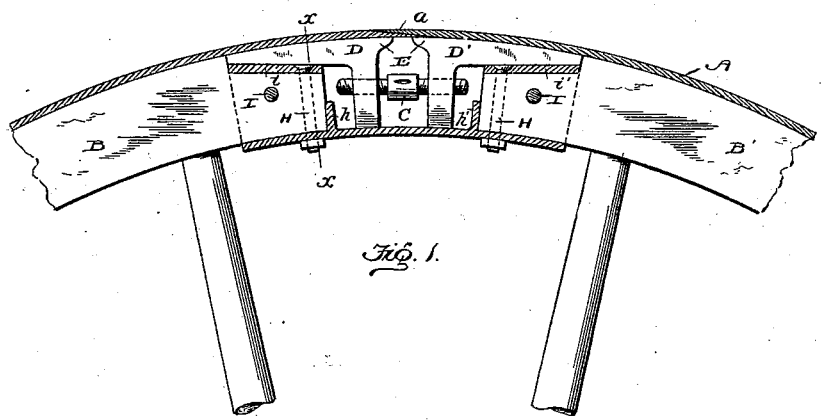
Fig. 1.
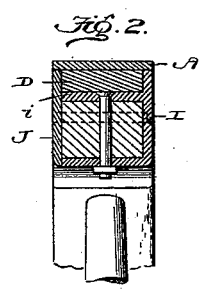
Fig. 2.
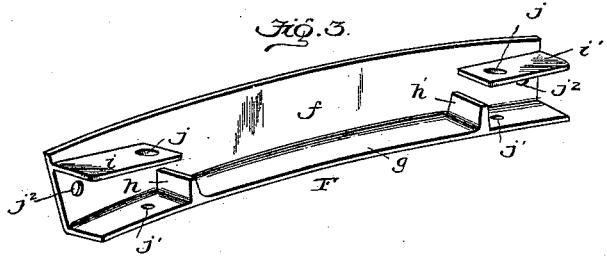
Fig. 3.
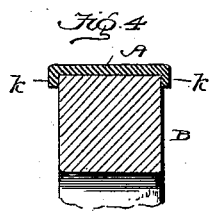 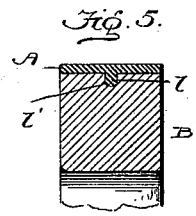
Fig. 4.          Fig. 5.
Witnesses          Grant J. Grandpre
                       Inventor
By Edson Bro's
         Atty's

UNITED STATES PATENT OFFICE.

GRANT J. GRANDPRE, OF CHAMBERLAIN, SOUTH DAKOTA.

TIRE-TIGHTENER.

SPECIFICATION forming part of Letters Patent No. 556,142, dated March 10, 1896.

Application filed November 6, 1895. Serial No. 568,116. (No model.)

*To all whom it may concern:*

Be it known that I, GRANT J. GRANDPRE, a citizen of the United States, residing at Chamberlain, in the county of Brule and State of South Dakota, have invented certain new and useful Improvements in Tire-Tighteners; and I do hereby declare the following to be a full, clear, and exact description of the invention, such as will enable others skilled in the art to which it appertains to make and use the same.

The present invention relates to improvements in tire-tighteners of that class which employ a right and left threaded bolt to draw the ends of the tire together and thereby contract the tire circumferentially around the wheel-felly, and the present invention is more particularly designed as an improvement upon the tire-tightener patented March 26, 1895, to Martin L. Howard and myself, No. 536,349.

The object of the present improvement is to strengthen and simplify the construction at the places where the ends of the felly are coupled to the boxing which incloses the adjusting-bolt, as well as to give a good secure bearing for the ends of the felly-sections in the boxing; and a further object of the invention is to strengthen the device at the places where the angle-irons are fastened to the boxing.

With these ends in view my invention consists in the novel construction and arrangement of parts which will be hereinafter fully described and claimed.

To enable others to understand my improvements I have illustrated the same in the accompanying drawings, forming a part of this specification, and in which—

Figure 1 is a longitudinal vertical sectional view through a tire-tightener and a portion of a wheel constructed in accordance with my invention. Fig. 2 is a vertical transverse sectional view on the plane indicated by the dotted line *x x*, looking in the direction indicated by the arrow. Fig. 3 is a detached perspective view of the boxing. Figs. 4 and 5 are detail cross-sectional views through the felly and tire, showing different forms of flanged or ribbed tires which may be used to keep the tire from slipping off the felly.

Like letters of reference denote corresponding parts in all the figures of the drawings, referring to which—

A designates a tire, and B B' are two of the sections of the felly, which are cut away on opposite sides of the joint *a*, where the two ends of the tire meet each other, so as to provide a space between the felly-sections for the accommodation of the means for tightening the tire. Broadly stated, this tightening means consists of a right and left threaded bolt C and the angle-irons D D'; but I have modified the construction of the angle-irons somewhat and provided means for bracing the angle-irons at the unsupported part of the tire, as will be explained. These angle-irons D D' have their shanks applied to the inner faces of the tire on opposite sides of the joint *a*, and said shanks of the angle-irons are rigidly fastened to the tire in any suitable way. Said angle-irons also have heads which extend substantially at right angles to the tire, and in the heads of the irons are provided openings and bearings which are threaded right and left, respectively, to receive the correspondingly-threaded ends of the bolt C. On the opposing faces of the heads of the angle-irons are provided the projections or lugs E E, each of which extends from its angle-irons toward the other angle-iron, and these lugs serve to strengthen the angle-irons and also serve in case of light wheels to prevent crushing if the tire is tightened too much.

F is the boxing which is applied over the open space between the ends of the felly so as to inclose the tightener and exclude dust, &c., therefrom, and this boxing is constructed in a novel way to strengthen the wheel at the place where the felly-sections are cut away, to brace the angle-irons at the place where the tire is unsupported, and to provide a strong secure seating for the ends of the felly-sections B B'.

The boxing is cast in a single piece of metal in the curved form shown by Fig. 3, and it consists of the plate *f*, the curved flange *g*, the short upright flanges *h h'*, and the short horizontal flanges *i i'*. The flanges *h h'* are arranged within the ends of the cast boxing at suitable distances inside of the same to provide ample room for the ends of the felly-sections B B' to seat themselves in the boxing and to abut against these flanges $h\ h'$. The flanges $h\ h'$ rise a suitable distance from the bottom $g$ of the boxing and are integral with the bottom $g$ and the upright plate $f$, which forms one side of the boxing; but said flanges do not extend up to the horizontal flanges $i\ i'$. Said horizontal flanges extend along the inner surface of the plate $f$ near its upper free edge, but at a suitable distance below the same, to accommodate the shanks of the angle-irons between said flanges $i\ i'$ and the tire. As the shanks of the angle-irons are tapered or inclined somewhat, I arrange the flanges $i\ i'$ in a slightly-inclined position, and the angle-iron shanks are thus caused to bear or rest firmly upon the flanges $i\ i'$, whereby the angle-irons are braced by the flanges $i\ i'$ and the wheel is strengthened at the place where it is unsupported by the felly. Said flanges $i\ i'$ extend from the ends of the plate $f$ to lines about over the vertical short flanges $h\ h'$, and in the upper faces of these flanges $i\ i'$ are formed countersunk holes $j$, which are in alignment with the holes $j'$ produced in the bottom $g$ of the boxing.

The ends of the felly-sections $B\ B'$ may be reduced or provided with tenons which are adapted to fit inside of the boxing against the bottom $g$, the flanges $i\ i'$ and the plate $f$ and to abut against the flanges $h\ h'$, and said felly-sections, or the tenons thereof, are secured firmly in place by bolts H I, which extend at right angles to each other. The open side of the boxing is designed to be closed by a plate J, which is applied to the edge of the bottom flange $g$ and the tire A over the ends of the felly-sections, and said plate is held in place by the bolts I I, which pass through openings in the plate J, the ends of the felly-sections $B\ B'$, and holes $j^2$ provided in the plate $f$ between the flanges $h\ i$ and the flanges $h'\ i'$, as shown. The heads of the bolts H are fitted in the countersunk openings $j$ of the flanges $i\ i'$, so as to avoid interference with the bearings of the angle-irons upon the flanges $i\ i'$, and said bolts H are passed through the ends of the felly-sections $B\ B'$ and the openings $j'$ in the bottom flange $g$.

It will be seen from the foregoing description, taken in connection with the drawings, that I have provided a strong and secure bearing for the ends of the felly-sections, which have long bearings in the boxing and are held securely in place by double sets of bolts to prevent weakening of the parts in case of shrinkage or expansion under changes in the weather. My boxing is comparatively light in weight, but at the same time has sufficient strength to stand the strain and wear, and the upright flanges $h\ h'$ are set in far enough for the ends or tenons of the felly-sections to have the long bearings therein, thereby doing away with the play that would be caused by having shoulders near or close up to the ends of the boxing. By providing the flanges $i\ i'$ and arranging the angle-irons to bear or press thereon the tightener is supported and the tire is prevented from bending should it strike or ride upon a stone at any point near the joint $a$, or where the tire is unsupported by the felly.

In Fig. 4 I have shown the tire A as provided with the flanges $k\ k$, which extend from the edges of the tire inwardly and are adapted to embrace the sides or faces of the felly to keep the tire from slipping off the felly.

Fig. 5 shows another way of holding the tire from slipping on the felly, which consists in providing an inwardly-extending flange $l$ arranged centrally on the tire and fitted in a central circumferential groove $l'$ in the felly $B\ B'$.

Having thus fully described my invention, what I claim as new, and desire to secure by Letters Patent, is—

1. The combination with a tire, of the boxing F having the flanges $i, i'$, the felly-sections seated in the boxing and fastened in place by bolts, the angle-irons fastened to the tire and resting upon the flanges $i, i'$ to be braced thereby and to strengthen the tire at the place where it is unsupported by the felly, and the bolt C fitted in the angle-irons, substantially as described.

2. The boxing F having the transverse abutments or flanges $h, h'$ within its ends and the flanges $i, i'$ arranged longitudinally on the plate $f$ and at one side of the flanges $h, h'$, in combination with the felly-sections having the long bearings in the ends of the boxing and resting against the side, bottom and the flanges $h, h'$ and $i, i'$ of said boxing; the face-plate; the bolts I passing through the boxing, the felly-sections and the face-plates; the bolts H seated in the flanges $i, i'$ and passing through the felly-sections and the bottom of the boxing; a tire, and a tightener-bolt, substantially as described.

3. The combination with a tire, of the boxing having the short longitudinal flanges $i, i'$ near its upper edge, the angle-irons united to the tire and seated upon the flanges $i, i'$ to be braced thereby and having the projecting lugs on their opposing faces, and the bolt supported in the heads of said angle-irons, substantially as described.

In testimony whereof I affix my signature in presence of two witnesses.

GRANT J. GRANDPRE.

Witnesses:
S. H. WRIGHT,
J. W. WARNSHUIS.